(12) United States Patent
Hsieh et al.

(10) Patent No.: US 12,302,184 B2
(45) Date of Patent: May 13, 2025

(54) LOW EARTH ORBIT SATELLITE SYSTEM AND HANDOVER METHOD FOR LOW EARTH ORBIT SATELLITES

(71) Applicant: INDUSTRIAL TECHNOLOGY RESEARCH INSTITUTE, Hsinchu (TW)

(72) Inventors: Tien Yuan Hsieh, Taoyuan (TW); Kuo-Huang Hsu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 568 days.

(21) Appl. No.: 17/692,382

(22) Filed: Mar. 11, 2022

(65) Prior Publication Data

US 2023/0171663 A1  Jun. 1, 2023

(30) Foreign Application Priority Data

Nov. 26, 2021   (TW) ................................ 110144162

(51) Int. Cl.
```
H04W 36/24     (2009.01)
H04B 7/185     (2006.01)
H04B 7/195     (2006.01)
H04W 36/00     (2009.01)
H04W 36/08     (2009.01)
H04W 84/06     (2009.01)
```
(52) U.S. Cl.
CPC ........ *H04W 36/24* (2013.01); *H04B 7/18513* (2013.01); *H04B 7/195* (2013.01); *H04W 36/0009* (2018.08); *H04W 36/08* (2013.01)

(58) Field of Classification Search
CPC ........................ H04W 16/28–32; H04W 84/06
See application file for complete search history.

(56) References Cited

U.S. PATENT DOCUMENTS

| 9,681,337 B2 | 6/2017 | Davis et al. |
| 10,506,483 B1 | 12/2019 | Williamson et al. |
| 11,044,008 B2 | 6/2021 | Ravishankar et al. |
| 2010/0015972 A1 | 1/2010 | Hong et al. |

(Continued)

FOREIGN PATENT DOCUMENTS

| CN | 103825647 A | 6/2014 |
| CN | 104735738 B | 8/2018 |

(Continued)

OTHER PUBLICATIONS

Taiwanese Office Action and Search Report for Taiwanese Application No. 110144162, dated Aug. 8, 2022.
(Continued)

*Primary Examiner* — San Htun
(74) *Attorney, Agent, or Firm* — Birch, Stewart, Kolasch & Birch, LLP (57) ABSTRACT

A Low Earth Orbit (LEO) satellite system is provided. The LEO satellite system includes a plurality of user equipment (UEs), a plurality of LEO satellites, and a ground station. The ground station obtains the required resources of each UE and the remaining resources of each LEO satellite. Based on the required resource of each UE and the remaining resource of each LEO satellite, the ground station determines to perform a handover to at least one UE of the plurality of UEs.

14 Claims, 6 Drawing Sheets

(56) References Cited

U.S. PATENT DOCUMENTS

| | | | |
|---|---|---|---|
| 2017/0105153 A1* | 4/2017 | Ashrafi | H04B 17/336 |
| 2017/0367019 A1 | 12/2017 | Schultz et al. | |
| 2019/0053119 A1 | 2/2019 | Benammar et al. | |
| 2020/0314914 A1* | 10/2020 | Roy | H04B 7/18523 |
| 2021/0036766 A1 | 2/2021 | Keshet et al. | |
| 2021/0058983 A1 | 2/2021 | Schmidt et al. | |
| 2021/0314060 A1 | 10/2021 | Shi et al. | |
| 2022/0046486 A1* | 2/2022 | Shrestha | H04W 36/0009 |
| 2022/0095179 A1* | 3/2022 | Qiao | H04B 7/185 |
| 2023/0216581 A1* | 7/2023 | Stanwood | H04B 7/18578 |
| | | | 398/125 |

FOREIGN PATENT DOCUMENTS

| | | |
|---|---|---|
| CN | 108230718 A | 12/2018 |
| CN | 110809292 A | 2/2020 |
| TW | I545006 B | 8/2016 |

OTHER PUBLICATIONS

Caponi et al., "Mobile-PEP: satellite terminal handover preserving service continuity," International Symposium on Wireless Communication Systems (ISWCS), 2015, total 5 pages.

He et al., "Losd-Aware Satellite Handover Strategy Based on Multi-Agent Reinforcement Learning," GLOBECOM 2020-2020 IEEE Global Communications Conference, 2020, total 6 pages.

KORAK et al., "Link-layer Handover in Earth-fixed LEO Satellite Systems," IEEE International Conference on Communications, 2019, total 5 pages.

Song et al., "Load Balancing and QoS Supporting Access and Handover Decision Algorithm for GEO/LEO Heterogeneous Satellite Networks," IEEE 4th International Conference on Computer and Communications (ICCC), 2018, pp. 640-645.

Yue et al., "An Inter Satellite Link Handover Management Scheme Based on Link Remaining Time." 2nd IEEE International Conference on Computer and Communications (ICCC), 2018, pp. 1799-1803.

Zhu et al., "User Clustering and Proactive Group Handover Scheduling in LEO Satellite Networks," IEEE Computing, Communications and IoT Applications (ComComAp), 2020, total 6 pages.

* cited by examiner

LOW EARTH ORBIT SATELLITE SYSTEM AND HANDOVER METHOD FOR LOW EARTH ORBIT SATELLITES

CROSS REFERENCE TO RELATED APPLICATIONS

This application claims priority of Taiwan Patent Application No. 110144162 filed on Nov. 26, 2021, the entirety of which is incorporated by reference herein.

BACKGROUND

Field of the Disclosure

The disclosure generally relates to Low Earth Orbit (LEO) satellite technology, and more particularly, to a LEO satellite technology for dynamic handover of LEO satellites.

Description of the Related Art

As Low Earth Orbit (LEO) satellite technology has progressed, applications using LEO satellites are being used more widely to provide communication services.

Because LEO satellites move quickly in orbit, the user equipment (UE) on the earth's surface may frequently hand over to new target satellites. However, when the remaining resources of the target satellite are insufficient, the service provided to the UE may be interrupted. Therefore, how to select a suitable target satellite for the UE is a subject worthy of discussion.

BRIEF SUMMARY

A Low Earth Orbit (LEO) satellite system and a handover method for the LEO satellites are provided.

An embodiment of the disclosure provides a Low Earth Orbit (LEO) satellite system. The LEO satellite system includes a plurality of UEs, a plurality of LEO satellites, and a ground station. The ground station obtains the required resources of each UE and the remaining resources of each LEO satellite. Based on this information, the ground station determines to perform a handover to one or more UEs.

In some embodiments, when a target UE triggers an interruption condition, the ground station determines the upper boundary and the lower boundary of each LEO satellite based on the required resources of the target UE and the remaining resources of each LEO satellite. The interruption condition indicates that a group of LEO satellites (which are among the aforementioned plurality of LEO satellites) in a service area corresponding to the target UE do not have enough resources to provide to the target UE. The ground station selects at least one candidate UE (from the UEs served by the group of LEO satellites corresponding to the service area based on the upper boundaries and the lower boundaries corresponding to the group of LEO satellites corresponding to the service area) and performs a handover to the candidate UE and the target UE.

In some embodiments, the ground station subtracts the remaining resources of each LEO satellite in the group of LEO satellites from the required resources of the target UE to obtain the lower boundary of each LEO satellite of the group of LEO satellites. In addition, according to the remaining resources of each LEO satellite in the group of LEO satellites, the ground station obtains the upper boundary of one LEO satellite of the group of LEO satellites by taking the maximum of the remaining resources of all of the LEO satellites in the group of LEO satellites except for the LEO satellite to be the upper boundary of the LEO satellite.

An embodiment of the disclosure provides a handover method for Low Earth Orbit (LEO) satellites. The handover method for LEO satellites is applied to a LEO satellite system, wherein the LEO satellite system comprises a plurality of UEs, a plurality of LEO satellites, and a ground station. The handover method for LEO satellites includes the steps of using the ground station to obtain the required resources of each UE and the remaining resources of each LEO satellite, and based on this information, the ground station determines to perform a handover to one or more of the UEs.

Other aspects and features of the disclosure will become apparent to those with ordinary skill in the art upon review of the following descriptions of specific embodiments of LEO satellite system and handover method for the LEO satellites.

BRIEF DESCRIPTION OF THE DRAWINGS

The disclosure will become more fully understood by referring to the following detailed description with reference to the accompanying drawings, wherein.

DETAILED DESCRIPTION

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
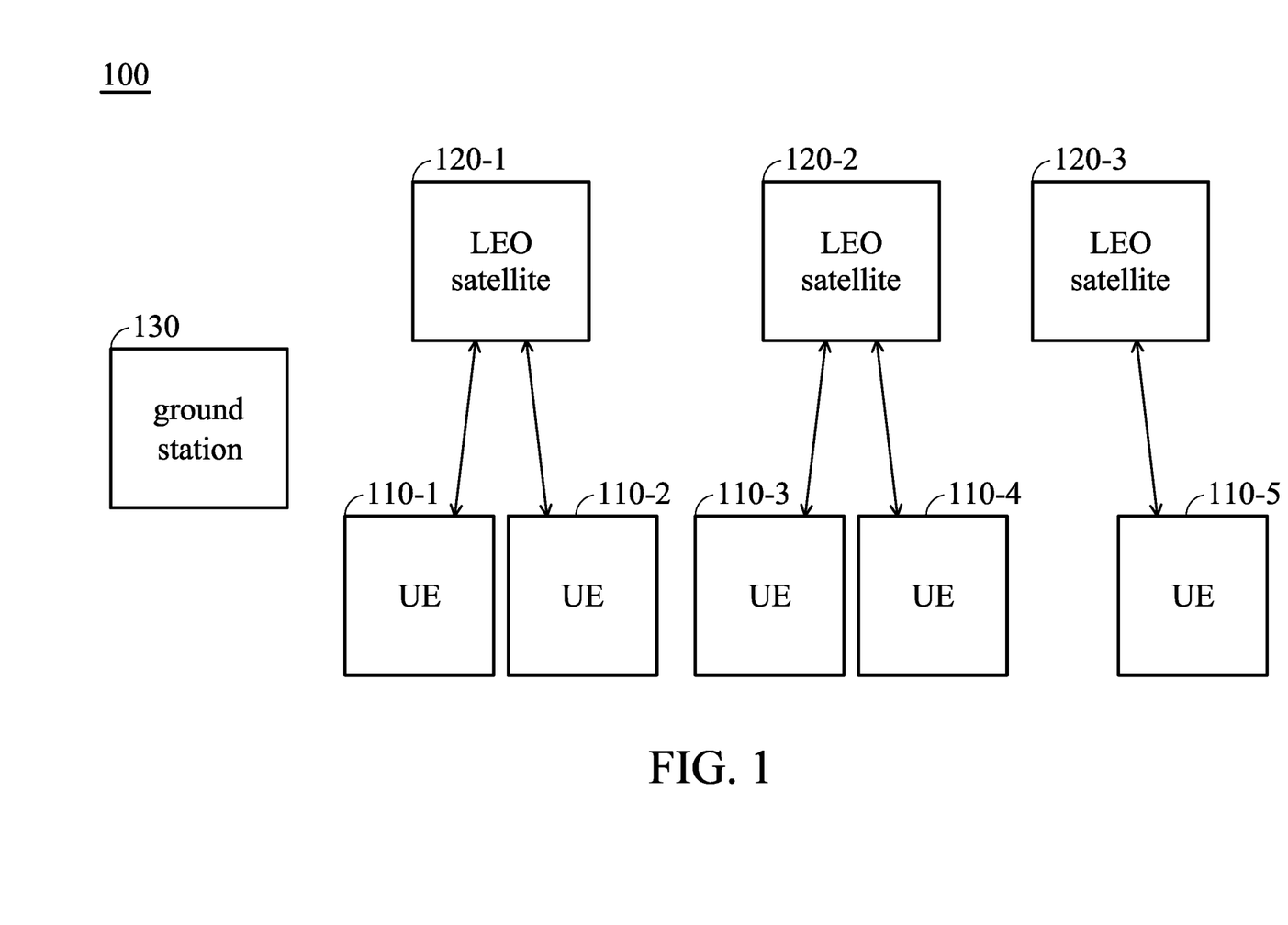
FIG. 1 is a Low Earth Orbit (LEO) satellite system 100 according to an embodiment of the disclosure.

FIG. 1 is a Low Earth Orbit (LEO) satellite system 100 according to an embodiment of the disclosure. As shown in FIG. 1, the LEO satellite system 100 may comprise user equipment (UE) 110-1, UE 110-2, UE 110-3, UE 110-4 and UE 110-5, and LEO satellite 120-1, LEO satellite 120-2, and LEO satellite 120-3 and aground station 130. It should be noted that FIG. 1 presents a simplified block diagram in which only the elements relevant to the disclosure are shown. However, the disclosure should not be limited to what is shown in FIG. 1. The LEO satellite system 100 may also comprise other UEs and LEO satellites.

According to the embodiments of the disclosure, the UEs 110-1, 110-2, 110-3, 110-4 and 110-5 may be tablet, smart phone or other electronic devices with LEO satellite communication function.

As shown in FIG. 1, the LEO satellite 120-1 may be used to provide services and resources to the UE 110-1 and UE 110-2 (i.e. the LEO satellite 120-1 is the current target satellite for the UE 110-1 and UE 110-2), the LEO satellite 120-2 may be used to provide services and resources to the UE 110-3 and UE 110-4 (i.e. the LEO satellite 120-2 is the current target satellite for the UE 110-3 and UE 110-4), the LEO satellite 120-3 may be used to provide services and resources to the UE 110-5 (i.e. the LEO satellite 120-3 is the current target satellite for the UE 110-5). When the LEO satellites move on the orbits, the target satellite of each UE may be changed.

Figure 2:
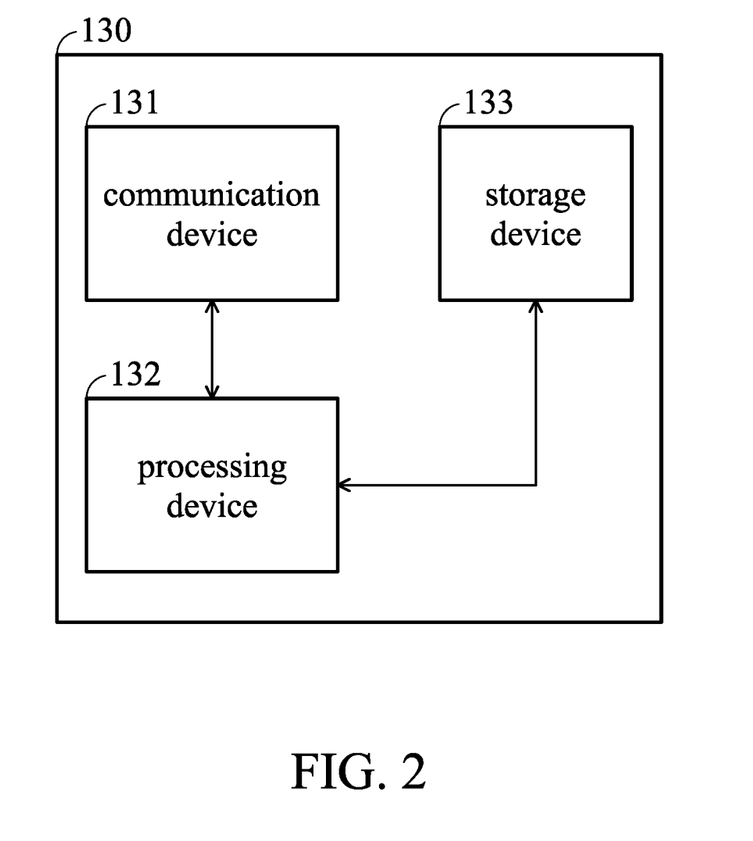
FIG. 2 is a block diagram of the ground station 130 according to an embodiment of the disclosure.

FIG. 2 is a block diagram of the ground station 130 according to an embodiment of the disclosure. As shown in FIG. 2, the ground station 130 may comprise a communication device 131, a processing device 132 and a storage device 133. It should be noted that FIG. 2 presents a simplified block diagram in which only the elements relevant to the disclosure are shown. However, the disclosure should not be limited to what is shown in FIG. 2. The ground station 130 may comprise other devices and elements.

According to the embodiments of the disclosure, the communication device 131 of the ground station 130 may obtain the information of the required resources of each UE (e.g. the UEs 110-1, 110-2, 110-3, 110-4 and 110-5) from each UE and obtain the information of remaining resources of each LEO satellite (e.g. the LEO satellites 120-1, 120-2 and 120-3) from each LEO satellite. In addition, the ground station 130 may communicate with each LEO satellite through the communication device 131 to transmit the indications to each LEO satellite. According to an embodiment, the required resources of UE may be the bandwidth requirement of the UE, but the disclosure should not be limited thereto. In addition, according to an embodiment of the disclosure, the remaining resources of LEO satellite may be the remaining bandwidth of the LEO satellite, but the disclosure should not be limited thereto.

According to the embodiments of the disclosure, the processing device 132 of the ground station 130 may be used to control and manage the LEO satellites 120-1, 120-2 and 120-3. The processing device 132 may determine the UE (or UEs) which each LEO satellite serve. That is to say, the processing device 132 may configure the target satellite to each UE. According to the embodiments of the disclosure, according to the required resources of each UE and the remaining resources of each LEO satellite, the processing device 132 may determine that at least one UE needs a handover to avoid a service interruption for the UE which triggers an interruption condition.

According to an embodiment of the disclosure, when a target UE (e.g. UE 110-1, UE 110-2, UE 110-3, UE 110-4 or UE 110-5) triggers an interruption condition, the processing device 132 of the ground station 130 may determine the upper boundary and the lower boundary of each LEO satellite in a service area corresponding to the target UE according to the required resources of the target UE and the remaining resources of each LEO satellite in the service area corresponding to the target UE. Details will be illustrated through FIGS. 3A-3C and FIGS. 4A-4C bellow. According to an embodiment of the disclosure, the interruption condition may indicate that according to current configurations of LEO satellites, the LEO satellites in the service area corresponding to the target UE do not have enough resources to provide to the target UE.

According to an embodiment of the disclosure, the processing device 132 of the ground station 130 may subtract the remaining resources of each LEO satellite in the service area corresponding to the target UE from the required resources of the target UE to obtain the lower boundary of each LEO satellite in the service area corresponding to the target UE. In addition, according to the remaining resources of each LEO satellite in the service area corresponding to the target UE, the processing device 132 may obtain an upper boundary of one LEO satellite by taking the maximum of the remaining resources of all LEO satellites except for the LEO satellite to be the upper boundary of the LEO satellite. Details will be illustrated through FIGS. 3A-3C and FIGS. 4A-4C bellow.

According to an embodiment of the disclosure, the ground station 130 may select at least one candidate UE (i.e. a UE or a UE group) based on the upper boundary and the lower boundary of each LEO satellite in the service area corresponding to the target UE, and perform a handover for the selected candidate UE (or candidate UE group) and the target UE to avoid an interruption of service provided to the target UE. In addition, according to an embodiment of the disclosure, the sum of required resources of the candidate UE (or candidate UE group) selected by the ground station 130 may be between the upper boundary and the lower boundary of the LEO satellite corresponding to the candidate UE (or candidate UE group). Details will be illustrated through FIGS. 3A-3C and FIGS. 4A-4C bellow.

According to the embodiments of the disclosure, the storage device 130 of the ground station 130 may store the information of the required resources of each UE and the information of remaining resources of each LEO satellite. According to an embodiment, the storage device 133 may be a volatile memory such as a Random Access Memory (RAM); a non-volatile memory such as a flash memory or Read-Only Memory (ROM); a hard disk; or a combination thereof.

Figure 3A:
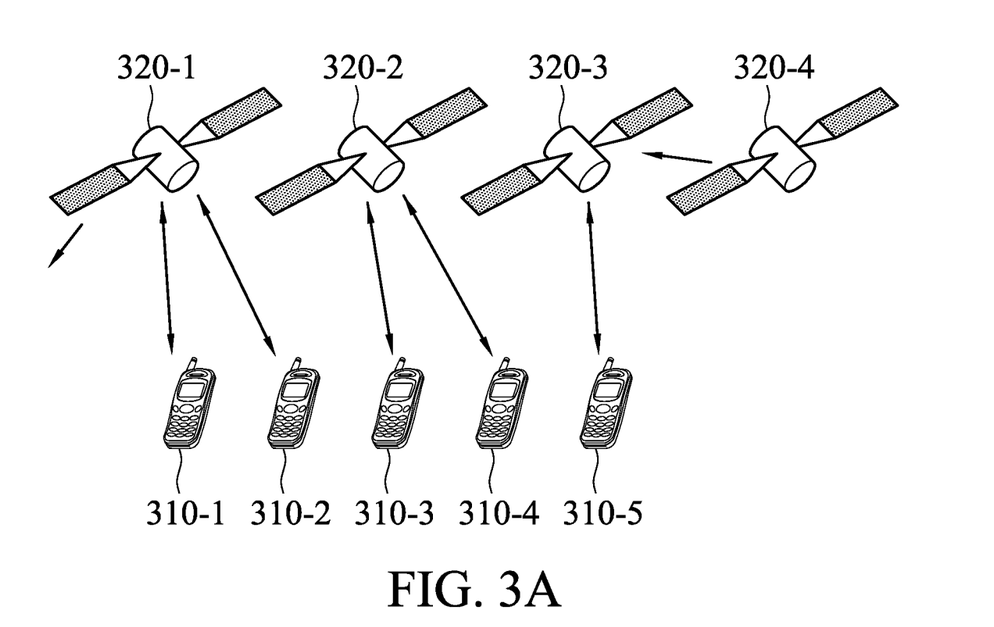
FIGS. 3A-3C are schematic diagrams illustrating the handover of the LEO satellites according to an embodiment of the disclosure.
Figure 3B:
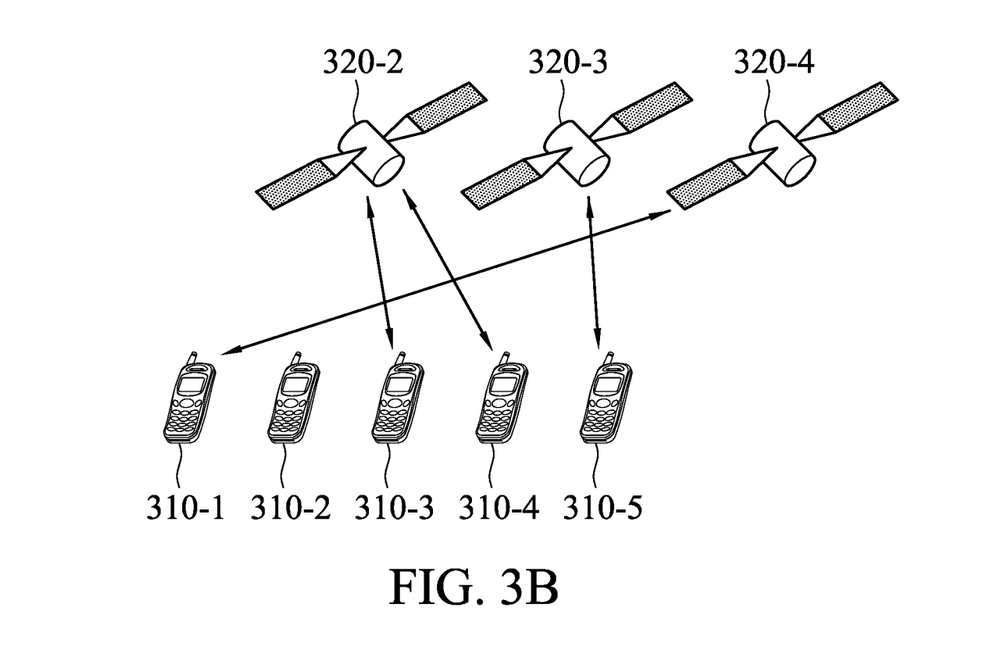
Figure 3C:
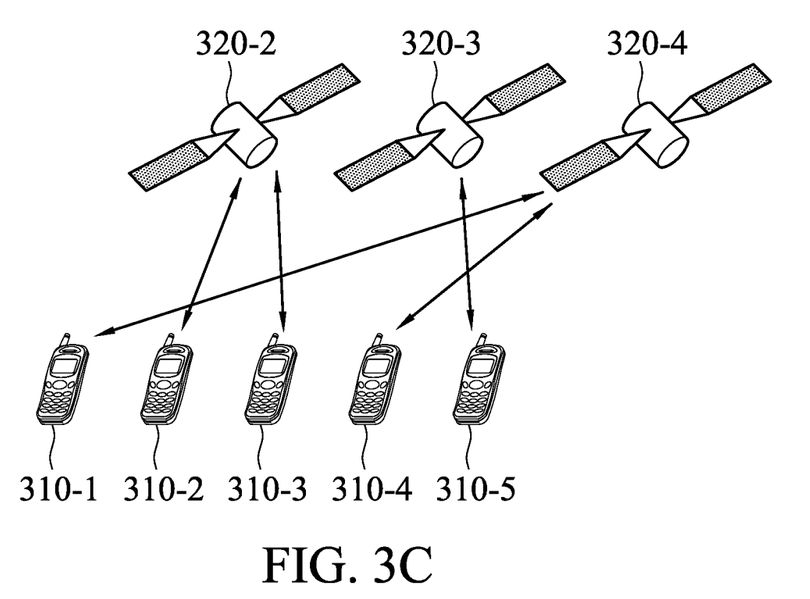

FIGS. 3A-3C are schematic diagrams illustrating the handover of the LEO satellites according to an embodiment of the disclosure. In the embodiment, it is assumed that the required resources of the UE 310-1 is 60, the required resources of the UE 310-2 is 50, the required resources of the UE 310-3 is 50, the required resources of the UE 310-4 is and the required resources of the UE 310-5 is 100. In addition, in the embodiment, it is assumed that the remaining resources of the LEO satellite 320-1 is 0, the remaining resources of the LEO satellite 320-2 is 20 and the remaining resources of the LEO satellite 320-3 is 0. As shown in FIG. 3A, in an initial stage, in the service areas corresponding to the UE 310-1~the UE 310-5, the LEO satellite 320-1 is allocated to provide services and resources to the UE 310-1 and the UE 310-2, the LEO satellite 320-2 is allocated to provide services and resources to the UE 310-3 and the UE 310-4 and the LEO satellite 320-3 is allocated to provide service and resource to the UE 310-5. When the LEO satellite 320-1 moving on the orbits is leaving the service areas of the UE 310-1 and the UE 310-2, another LEO satellite 320-4 may move into the service areas of the UE 310-1 and the UE 310-2, wherein the remaining resources of the LEO satellite 320-4 is 90.

As shown in FIG. 3B, the ground station 130 may allocate the LEO satellite 320-4 to provide services and resources to the UE 310-1 and the UE 310-2 (i.e. taking the LEO satellite 320-4 as the target satellite of the UE 310-1 and the UE 310-2). However, after the LEO satellite 320-4 provides the service and resource to the UE 310-1, the remaining resources of the LEO satellite 320-4 only remains 30 (90−60=30). Therefore, the LEO satellite 320-4 may not have enough remaining resources to provide the service and resource to the UE 310-2. That is to say, if the ground station 130 directly allocate the LEO satellite 320-4 to be the target satellite of the UE 310-1 and the UE 310-2, the service provided to the UE 310-2 may be interrupted (i.e. the interruption condition is triggered). Therefore, the ground station 130 may obtain upper boundaries and lower boundaries of the LEO satellite 320-2~the LEO satellite 320-4 based on the required resources of the UE 310-2 (i.e. the target UE) and the remaining resources of the LEO satellite 320-2~the LEO satellite 320-4. Then, according to the upper boundaries and lower boundaries of the LEO satellite 320-2~the LEO satellite 320-4, the ground station 130 may select at least one appropriate UE from the UE 310-1, the UE 310-3, the UE 310-4 and the UE 310-5 to perform the handover to avoid interruption in the service provided to the UE 310-2 (the target UE).

Specifically, the ground station 130 may respectively subtract the remaining resources of the LEO satellite 320-2~the LEO satellite 320-4 from the required resources of the UE 310-2 to obtain the lower boundaries of the LEO satellite 320-2~the LEO satellite 320-4. The lower boundaries of the LEO satellites 320-2~320-4 are 30 (50−20=30), 50 (50−0=50) and 20 (50−30=20) respectively. In addition, the ground station 130 may obtain the upper boundaries of the LEO satellite 320-2~the LEO satellite 320-4 by respectively taking the maximum of the remaining resources of all LEO satellites except for the LEO satellite to be the upper boundary of the LEO satellite. For example, the upper boundary of the LEO satellite 320-2 is the maximum (i.e. 30) of the remaining resources of the LEO satellites 320-3 (0) and the remaining resources of the LEO satellites 320-4 (30), the upper boundary of the LEO satellite 320-3 is the maximum (i.e. 30) of the remaining resources of the LEO satellites 320-2 (20) and the remaining resources of the LEO satellites 320-4 (30), the upper boundary of the LEO satellite 320-4 is the maximum (i.e. 20) of the remaining resources of the LEO satellites 320-2 (20) and the remaining resources of the LEO satellites 320-3 (0).

After the ground station 130 obtains the lower boundaries of the LEO satellites 320-2~320-4, the ground station 130 may select at least on candidate UE from the UE 310-1, the UE 310-3, the UE 310-4 and the UE 310-5 to perform the handover to avoid interruption of the service provided to the UE 310-2. Specifically, the ground station 130 may determine whether there is a UE that can be found among the UEs served by the LEO satellite 320-4 to satisfy a condition: the lower boundary of the LEO satellite 320-4 (20)≤the required resources of the UE≤the upper boundary of the LEO satellite 320-4 (20) and determine whether there is a UE among the UEs served by the LEO satellite 320-2 to satisfy a condition: the lower boundary of the LEO satellite 320-2 (30)≤the required resources of the UE≤the upper boundary of the LEO satellite 320-2 (30). Because the lower boundary of the LEO satellite 320-3 (50) is greater than the upper boundary of the LEO satellite 320-3 (30), the ground station 130 may not be able to find a candidate UE from among the UEs served by the LEO satellite 320-3.

The ground station 130 cannot find a UE among the UEs served by the LEO satellite 320-4 to satisfy the above condition. The ground station 130 finds the UE 310-4 (candidate UE) from the UEs served by the LEO satellite 320-2 to satisfy the above condition. Therefore, as shown in FIG. 3C, the ground station 130 may hand over the UE 310-4 (candidate UE) to the LEO satellite 320-4 and hand over the UE 310-2 (target UE) to the LEO satellite 320-2 to avoid interruption of the service provided to the UE 310-2.

Figure 4A:
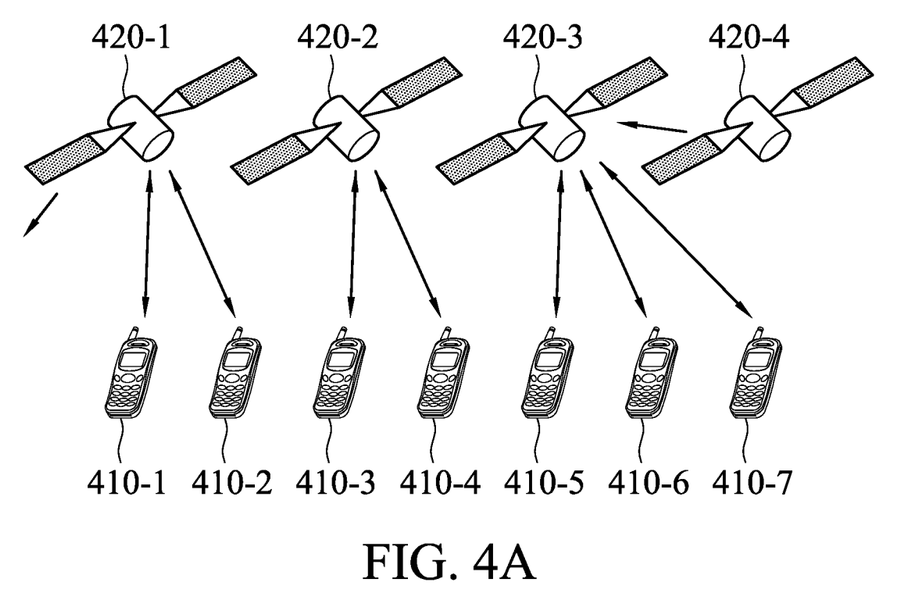
FIGS. 4A-4C are schematic diagrams illustrating the handover of the LEO satellites according to another embodiment of the disclosure.
Figure 4B:
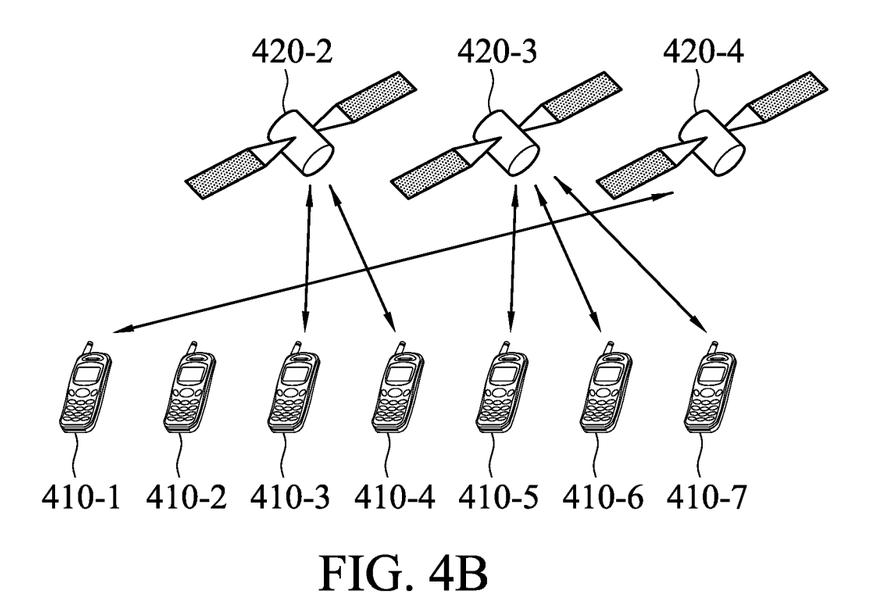
Figure 4C:
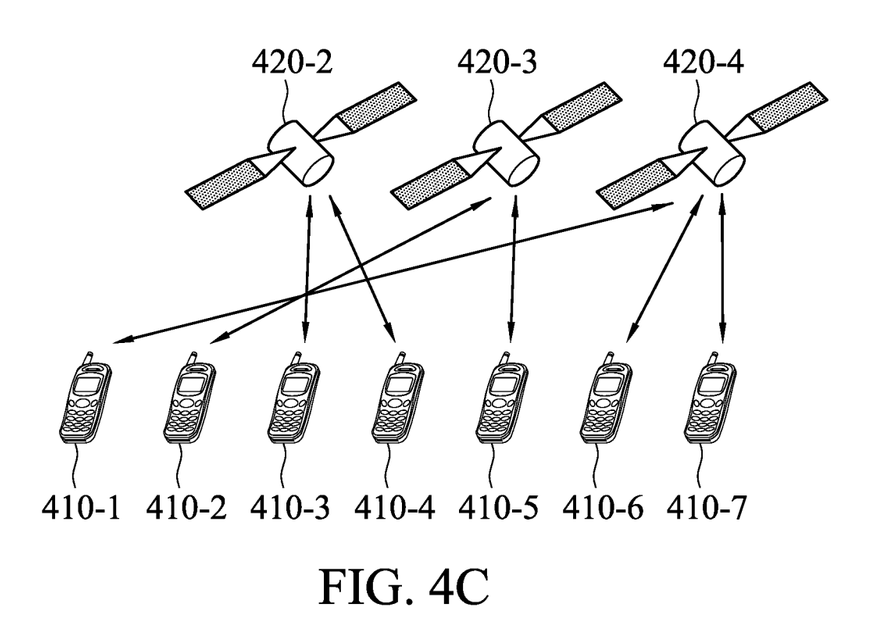

FIGS. 4A-4C are schematic diagrams illustrating the handover of the LEO satellites according to another embodiment of the disclosure. In the embodiment, it is assumed that the required resources of the UE 410-1 is 60, the required resources of the UE 410-2 is 50, the required resources of the UE 410-3 is 50, the required resources of the UE 410-4 is 30, the required resources of the UE 410-5 is 50, the required resources of the UE 410-6 is 19 and the required resources of the UE 410-7 is 11. In addition, in the embodiment, it is assumed that the remaining resources of the LEO satellite 420-1 is 0, the remaining resources of the LEO satellite 420-2 is 0 and the remaining resources of the LEO satellite 420-3 is 30. As shown in FIG. 4A, in an initial stage, in the service areas corresponding to the UE 410-1~the UE 410-7, the LEO satellite 420-1 is allocated to provide services and resources to the UE 410-1 and the UE 410-2, the LEO satellite 420-2 is allocated to provide services and resources to the UE 410-3 and the UE 410-4, the LEO satellite 420-3 is allocated to provide services and resources to the UE 410-5, the UE 410-6 and the UE 410-7. When the LEO satellite 420-1 moving on the orbits is leaving the service areas of the UE 410-1 and the UE 410-2, another LEO satellite 320-4 may move into the service areas of the UE 410-1 and the UE 410-2, wherein the remaining resources of the LEO satellite 420-4 is 90.

As shown in FIG. 4B, the ground station 130 may determine to allocate the LEO satellite 420-4 to provide services and resources to the UE 410-1 and the UE 410-2 (i.e. taking the LEO satellite 420-4 as the target satellite of the UE 410-1 and the UE 410-2). However, after the LEO satellite 420-4 provides the service and resource to the UE 410-1, the remaining resources of the LEO satellite 420-4 only remains 30 (90−60=30). Therefore, the LEO satellite 320-4 may not have enough remaining resources to provide the service and resource to the UE 410-2. That is to say, if the ground station 130 directly allocate the LEO satellite 420-4 to be the target satellite of the UE 410-1 and the UE 410-2, the service provided to the UE 410-2 may be interrupted (i.e. the interruption condition is triggered). Therefore, the ground station 130 may obtain upper boundaries and lower boundaries of the LEO satellite 420-2~the LEO satellite 420-4 based on the required resources of the UE 410-2 (i.e. the target UE) and the remaining resources of the LEO satellite 420-2~the LEO satellite 420-4. Then, according to the upper boundaries and lower boundaries of the LEO satellite 420-2~the LEO satellite 4204, the ground station 130 may select at least one appropriate UE from the UE 410-1, the UE 410-3, the UE 410-4, the UE 410-5, the UE 410-6 and the UE 410-7 to perform the handover to avoid interruption of the service provided to the UE 410-2 (the target UE).

Specifically, the ground station 130 may respectively subtract the remaining resources of the LEO satellite 420-2~the LEO satellite 420-4 from the required resources of the UE 410-2 to obtain the lower boundaries of the LEO satellite 420-2~the LEO satellite 420-4. The lower boundaries of the LEO satellite 420-2~the LEO satellite 420-4 are 50 (50−0=50), 20 (50−30=20) and 20 (50−30=20) respectively. In addition, the ground station 130 may obtain the upper boundaries of the LEO satellite 420-2 the LEO satellite 420-4 by respectively taking the maximum of the remaining resources of all LEO satellites except for the LEO satellite to be the upper boundary of the LEO satellite. For example, in the embodiment, the upper boundary of the LEO satellite 420-2 is the maximum (i.e. 30) of the remaining resources of the LEO satellites 420-3 (30) and the remaining resources of the LEO satellites 420-4 (30), the upper boundary of the LEO satellite 420-3 is the maximum (i.e. 30) of the remaining resources of the LEO satellites 420-2 (0) and the remaining resources of the LEO satellites 420-4 (30), the upper boundary of the LEO satellite 420-4 is the maximum (i.e. 30) of the remaining resources of the LEO satellites 420-2 (0) and the remaining resources of the LEO satellites 420-3 (30).

After the ground station 130 obtains the lower boundaries of the LEO satellite 420-2~the LEO satellite 420-4, the ground station 130 may select at least on candidate UE from the UE 410-1, the UE 410-3, the UE 410-4, the UE 410-5, the UE 410-6 and the UE 410-7 to perform the handover to avoid any interruption in the service provided to the UE 410-2 (target UE). Specifically, the ground station 130 may determine whether there is a UE that can be found among the UEs served by the LEO satellite 420-4 to satisfy a condition: the lower boundary of the LEO satellite 420-4 (20)≤the required resources of the UE≤the upper boundary of the LEO satellite 420-4 (30) and determine whether there is a UE that can be found among the UEs served by the LEO satellite 420-3 to satisfy a condition: the lower boundary of the LEO satellite 420-3 (20)≤the required resources of the UE≤the upper boundary of the LEO satellite 420-3 (30). Because the lower boundary of the LEO satellite 420-2 (50) is greater than the upper boundary of the LEO satellite 420-2 (20), the ground station 130 may not be able to find a candidate UE from among the UEs served by the LEO satellite 420-2.

The ground station 130 cannot find a UE among the UEs served by the LEO satellite 420-4 to satisfy the above condition. In addition, the ground station 130 also cannot find a UE among the UEs served by the LEO satellite 420-3 to satisfy the above condition. Therefore, the ground station 130 may determine whether there are two UEs that can be found among the UEs served by the LEO satellite 420-4 to satisfy a condition: the lower boundary of the LEO satellite 420-4 (20)≤sum of the required resources of the two UEs≤the upper boundary of the LEO satellite 420-4 (30) and determine whether there are two UEs that can be found among the UEs served by the LEO satellite 420-3 to satisfy a condition: the lower boundary of the LEO satellite 420-3 (20)≤sum of the required resources of the two UEs≤the upper boundary of the LEO satellite 420-3 (30). The ground station 130 cannot find two UEs from the UEs served by the LEO satellite 420-4 to satisfy the above condition. The ground station 130 finds the UE 410-6 and the UE 410-7 (candidate UE group) from the UEs served by the LEO satellite 420-2 to satisfy the above condition. Therefore, as shown in FIG. 4C, the ground station 130 may hand over the UE 410-6 and the UE 410-7 (candidate UE group) to the LEO satellite 420-4 and hand over the UE 410-2 (target UE) to the LEO satellite 420-2 to avoid interruption of the service provided to the UE 410-2.

It should be noted that the schematic diagrams of FIGS. 3A-3C and FIGS. 4A-4C may be only used to illustrate the embodiments of the disclosure, but the disclosure should not be limited thereto.

According to an embodiment of the disclosure, based on the upper boundaries and the lower boundaries of the LEO satellites in the service areas corresponding to the UEs, the ground station 130 may respectively find the candidate UE (or candidate UE group) from the UEs served by each LEO satellite in the service areas at the same time. Taking FIGS. 4A-4C as an example, the ground station 130 may find the candidate UE (or candidate UE group) from the UEs served by each of the LEO satellite 420-2~the LEO satellite 420-4 at the same time. The operation for each of the LEO satellite 420-2~the LEO satellite 420-4 is independent. For example, the ground station 130 may determine whether there is a UE that can be found among the UEs served by the LEO satellite 420-2 to satisfy a condition. If the ground station 130 cannot find a UE among the UEs served by the LEO satellite 420-2 to satisfy the above condition, the ground station 130 may determine whether there are two UEs that can be found among the UEs served by the LEO satellite 420-2 to satisfy the condition. Accordingly, if the ground station 130 cannot find any UE or UE group from the UEs served by the LEO satellite 420-2 to satisfy the above condition, the ground station 130 will stop looking for a candidate UE or candidate UE group from among the UEs served by the LEO satellite 420-2. Similarly, the same operations may be operated for LEO satellite 420-3 and LEO satellite 420-4 at the same time.

According to another embodiment of the disclosure, based on the upper boundaries and the lower boundaries of the LEO satellites in the service areas corresponding to the UEs, the ground station 130 may sequentially find the candidate UE (or candidate UE group) from the UEs served by each LEO satellite in the service areas. Taking FIGS. 4A-4C as an example, the ground station 130 may sequentially determine whether there is a UE that can be found among the UEs served by the LEO satellite 420-2~the LEO satellite 420-4 to satisfy a corresponding condition of each of the LEO satellite 420-2~the LEO satellite 420-4. If the ground station 130 cannot find a UE among the UEs served by the LEO satellite 420-2~the LEO satellite 420-4 to satisfy the above condition, the ground station 130 may sequentially determine whether there are two UEs that can be found among the UEs served by the LEO satellite 420-2~the LEO satellite 420-4 to satisfy the condition. Accordingly, if the ground station 130 cannot find two UEs from the UEs served by the LEO satellite 420-2 to satisfy the above condition, the ground station 130 may continue to sequentially determine whether there are appropriate UE groups (e.g. three or more UEs) that can be found among the UEs served by the LEO satellite 420-2~the LEO satellite 420-4 to satisfy the condition.

According to the embodiments of the disclosure, before the ground station 130 finds the candidate UE from among the UEs served by a LEO satellite, the ground station 130 may sort the UEs served by the LEO satellite according to the required resources of each UE served by the LEO satellite. Then, the ground station 130 may find appropriate candidate UE or UE group from the sorted UEs served by the LEO satellite. For example, if the sorted UEs served by a LEO satellite A are UEs $\{X_1, X_2, X_3, \ldots, X_{11}, X_{12}\}$, the ground station 130 may determine whether there is an appropriate candidate UE whose required resources are consistent with the condition from the UE $X_{12}$. If the ground station 130 cannot find an appropriate candidate UE whose required resources are consistent with the condition from the UE $X_1$~UE $X_{12}$, the ground station 130 may determine whether there are two appropriate candidate UEs whose total required resources satisfy the condition based on the order of UEs $\{X_{11}, X_{12}\}$, UEs $\{X_{10}, X_{11}\}$ . . . UEs $\{X_{12}, X_1\}$. Accordingly, if the ground station 130 cannot find two appropriate candidate UEs whose total required resources are consistent with the condition from UEs $\{X_{11}, X_{12}\}$, UEs $\{X_{10}, X_{11}\}$ . . . UEs $\{X_{12}, X_1\}$, the ground station 130 may determine whether there are three appropriate candidate UEs whose total required resources satisfy the condition based on the order of UEs $\{X_{10}, X_{11}, X_{12}\}$, UEs $\{X_9, X_{10}, X_{11}\}$ . . . UEs $\{X_{11}, X_1, X_2\}$. It should be noted that the above example is only used to illustrate the embodiment of the disclosure, but the disclosure should not be limited thereto. For example, the ground station 130 also can determine whether there is an appropriate candidate UE whose required resources are consistent with the condition from the UE $X_1$.

According to the embodiments of the disclosure, if the ground station 130 find candidate UEs or candidate UE groups from different LEO satellites, the ground station 130 may select one of the UEs or one of the candidate UE groups to perform the handover.

Figure 5:
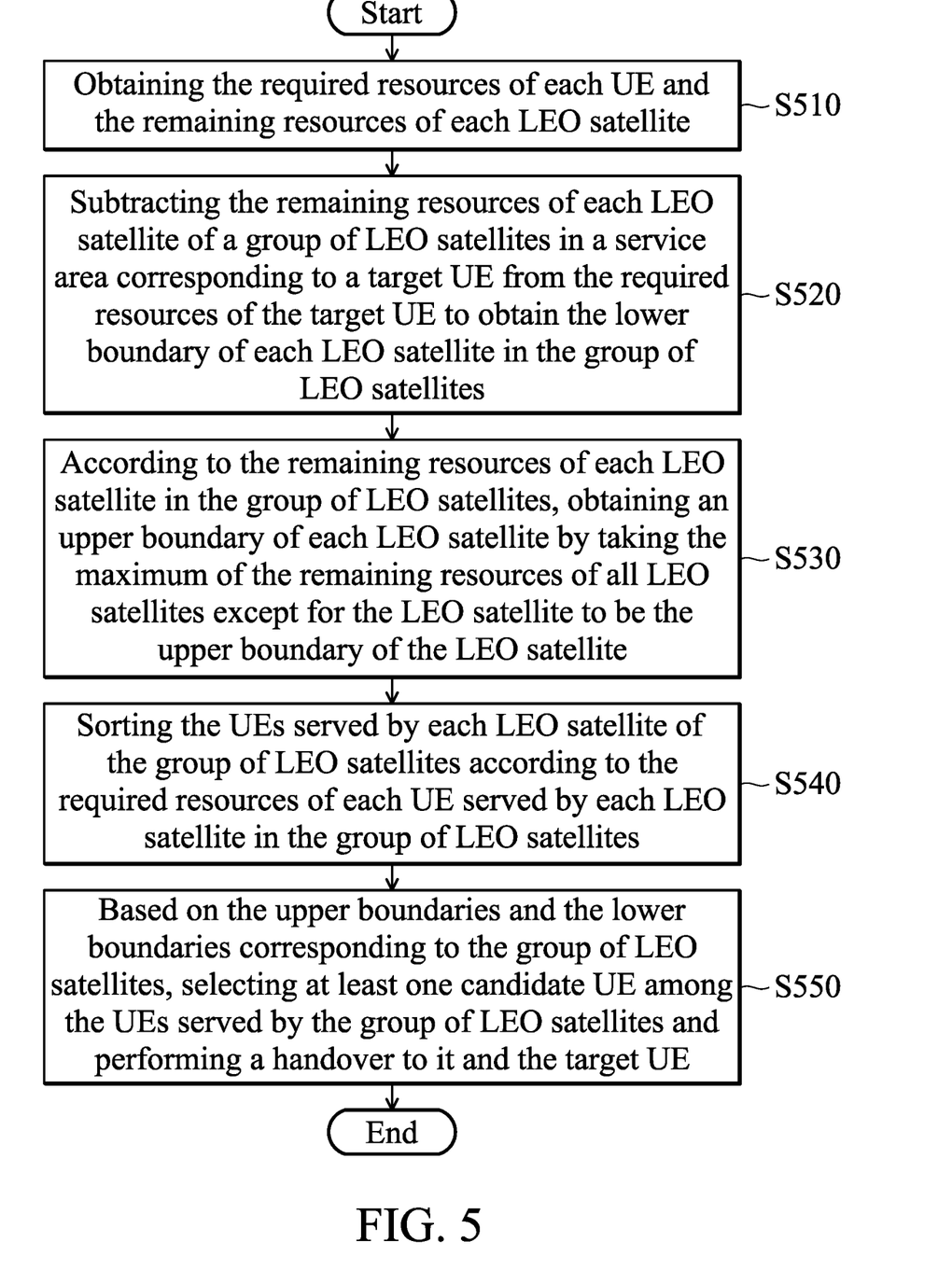
FIG. 5 is a flow chart illustrating a handover method for LEO satellites according to an embodiment of the disclosure.

FIG. 5 is a flow chart illustrating a handover method for Low Earth Orbit (LEO) satellites according to an embodiment of the disclosure. The handover method for LEO satellites can be applied to the LEO satellite system 100. As shown in FIG. 5, in step S510, a ground station 130 of the LEO satellite system 100 may obtain the required resources of each UE of the LEO satellite system 100 and the remaining resources of each LEO satellite of the LEO satellite system 100.

In step S520, the ground station 130 of the LEO satellite system 100 may subtract the remaining resources of each LEO satellite of a group of LEO satellites in a service area corresponding to a target UE from the required resources of the target UE to obtain the lower boundary of each LEO satellite in the group of LEO satellites.

In step S530, according to the remaining resources of each LEO satellite in the group of LEO satellites, the ground station 130 of the LEO satellite system 100 may obtain an upper boundary of each LEO satellite by taking the maximum of the remaining resources of all LEO satellites except for the LEO satellite to be the upper boundary of the LEO satellite.

In step S540, the ground station of the LEO satellite system 100 may sort the UEs served by each LEO satellite of the group of LEO satellites according to the required resources of each UE served by each LEO satellite in the group of LEO satellites.

In step S550, based on the upper boundaries and the lower boundaries corresponding to the group of LEO satellites, the ground station 130 of the LEO satellite system 100 may select at least one candidate UE among the UEs served by the group of LEO satellites and perform a handover to the selected candidate UE (or candidate UE group) and the target UE.

According to an embodiment of the disclosure, in the handover method for LEO satellites, when a target UE of a plurality of UEs triggers an interruption condition, the ground station 130 may obtain the upper boundary and the lower boundary of each LEO satellite in the group of LEO satellites according to the required resources of the target UE and the remaining resources of each LEO satellite of the group of LEO satellites. According to an embodiment of the disclosure, the presence of an interruption condition may indicate that the LEO satellites of the group of LEO satellites in the service area corresponding to the target UE do not have enough resources to provide to the target UE.

According to an embodiment of the disclosure, in the handover method for LEO satellites, based on the upper boundary and the lower boundary of each LEO satellite in the group of LEO satellites, the ground station 130 may respectively determine whether there is a candidate UE or a candidate UE group in the UEs served by each LEO satellite of the group of LEO satellites at the same time.

According to an embodiment of the disclosure, in the handover method for LEO satellites, based on the upper boundary and the lower boundary of each LEO satellite in the group of LEO satellites, the ground station 130 may sequentially determine whether there is a candidate UE or a candidate UE group in the UEs served by each LEO satellite in the group of LEO satellites.

According to an embodiment of the disclosure, in the handover method for LEO satellites, the total required resources of the selected candidate UE or candidate UE group are between the upper boundary and the lower boundary of the LEO satellite corresponding to the selected candidate UE or candidate UE group.

According to the handover method for LEO satellites provided in the disclosure, when the service of a UE may be interrupted, the ground station can dynamically allocate the LEO satellite serving the UE to avoid interruption of the service provided to the UE. In addition, according to the handover method for LEO satellites provided in the disclosure, the complexity of selecting the candidate UE or candidate UE group from the UEs served by the LEO satellite will be reduced.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory. ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

The above paragraphs describe many aspects. Obviously, the teaching of the disclosure can be accomplished by many methods, and any specific configurations or functions in the disclosed embodiments only present a representative condition. Those who are skilled in this technology will understand that all of the disclosed aspects in the disclosure can be applied independently or be incorporated.

While the disclosure has been described by way of example and in terms of preferred embodiment, it should be understood that the disclosure is not limited thereto. Those who are skilled in this technology can still make various alterations and modifications without departing from the scope and spirit of this disclosure. Therefore, the scope of the present disclosure shall be defined and protected by the following claims and their equivalents.

What is claimed is:

1. A Low Earth Orbit (LEO) satellite system, comprising:
a plurality of user equipment (UEs);
a plurality of LEO satellites; and
a ground station, obtaining required resources of each UE and remaining resources of each LEO satellite,
wherein based on the required resources of each UE and the remaining resources of each LEO satellite, the ground station determines to perform a handover to at least one UE of the plurality of UEs,
wherein when a target UE of the plurality of UEs triggers an interruption condition, the ground station determines an upper boundary and a lower boundary for each LEO satellite based on the required resources of the target UE and the remaining resources of each LEO satellite,
wherein the interruption condition indicates that a group of LEO satellites of the plurality of LEO satellites in a service area corresponding to the target UE do not have enough resources to provide to the target UE, and
wherein the ground station selects at least one candidate UE from among the UEs served by the group of LEO satellites in the service area based on the upper boundaries and the lower boundaries of the LEO satellites in the group of LEO satellites in the service area, and performs the handover to the at least one candidate UE and the target UE.

2. The LEO satellite system of claim 1, wherein based on the upper boundaries and the lower boundaries corresponding to the group of LEO satellites corresponding to the service area, the ground station respectively determines whether there is the at least one candidate UE among the UEs served by each LEO satellite in the group of LEO satellites at the same time.

3. The LEO satellite system of claim 1, wherein based on the upper boundaries and the lower boundaries of the LEO satellites in the group of LEO satellites in the service area, the ground station sequentially determines whether there is the at least one candidate UE among the UEs served by each LEO satellite of the group of LEO satellites.

4. The LEO satellite system of claim 1, wherein total required resources corresponding to the at least one candidate UE is between the upper boundary and the lower boundary of the satellite corresponding to at least one candidate UE.

5. The LEO satellite system of claim 1, wherein the ground station subtracts the remaining resources of each LEO satellite in the group of LEO satellites from the required resources of the target UE to obtain the lower boundary of each LEO satellite in the group of LEO satellites.

6. The LEO satellite system of claim 1, wherein, according to the remaining resources of each LEO satellite in the group of LEO satellites, the ground station obtains the upper boundary of one LEO satellite of the group of LEO satellites by taking the maximum of the remaining resources of all LEO satellites in the group of LEO satellites except for the LEO satellite to be the upper boundary of the LEO satellite.

7. The LEO satellite system of claim 1, wherein before the ground station selects at least one candidate UE, the ground station sorts the UEs served by each LEO satellite according to the required resources of each UE served by each LEO satellite.

8. A handover method for Low Earth Orbit (LEO) satellites, applied to a LEO satellite system, wherein the LEO satellite system comprises a plurality of user equipment (UEs), a plurality of LEO satellites, and a ground station, comprising:
obtaining, by the ground station, required resources of each UE and remaining resources of each LEO satellite;
based on the required resources of each UE and the remaining resources of each LEO satellite, determining, by the ground station to perform a handover to at least one UE of the plurality of UEs,
wherein the method further comprises:
when a target UE of the plurality of UEs triggers an interruption condition, determining, by the ground station, an upper boundary and a lower boundary of each LEO satellite based on the required resources of the target UE and the remaining resources of each LEO satellite, wherein the interruption condition indicates that a group of LEO satellites of the plurality of LEO satellites in a service area corresponding to the target UE do not have enough resources to provide to the target UE; and
selecting, by the ground station, at least one candidate UE among the UEs served by the group of LEO satellites corresponding to the service area based on the upper boundaries and the lower boundaries corresponding to the group of LEO satellites corresponding to the service area, and performs the handover to the at least one candidate UE and the target UE.

9. The handover method for LEO satellites of claim 8, further comprising:
based on the upper boundaries and the lower boundaries corresponding to the group of LEO satellites corresponding to the service area, respectively determining, by the ground station, whether there is the at least one candidate UE among the UEs served by each LEO satellite in the group of LEO satellites at the same time.

10. The handover method for LEO satellites of claim 8, further comprising:
based on the upper boundaries and the lower boundaries corresponding to the group of LEO satellites corresponding to the service area, sequentially determining, by the ground station, whether there is the at least one candidate UE among the UEs served by each LEO satellite in the group of LEO satellites.

11. The handover method for LEO satellites of claim 8, wherein total required resources corresponding to the at least one candidate UE is between the upper boundary and the lower boundary of the satellite corresponding to at least one candidate UE.

12. The handover method for LEO satellites of claim 8, further comprising:
subtracting, by the ground station, the remaining resources of each LEO satellite in the group of LEO satellites from the required resources of the target UE to obtain the lower boundary of each LEO satellite in the group of LEO satellites.

13. The handover method for LEO satellites of claim 8, further comprising:
according to the remaining resources of each LEO satellite in the group of LEO satellites, obtaining, by the ground station, the upper boundary of one LEO satellite of the group of LEO satellites by taking the maximum of the remaining resources of all LEO satellites in the group of LEO satellites except for the LEO satellite to be the upper boundary of the LEO satellite.

14. The handover method for LEO satellites of claim 8, further comprising:
before selecting at least one candidate UE, sorting, by the ground station, the UEs served by each LEO satellite according to the required resources of each UE served by each LEO satellite.

* * * * *